(12) United States Patent
Sun

(10) Patent No.: US 10,196,281 B2
(45) Date of Patent: Feb. 5, 2019

(54) OUTDOOR WATER PURIFIER WITH BACKWASHING FUNCTION

(71) Applicant: DongGuan Diercon Technology Co., Ltd., Dongguan (CN)

(72) Inventor: Yinhuan Sun, Dongguan (CN)

(73) Assignee: DONGGUAN DIERCON TECHNOLOGY CO., LTD., Dongguan (CN)

( * ) Notice: Subject to any disclaimer, the term of this patent is extended or adjusted under 35 U.S.C. 154(b) by 192 days.

(21) Appl. No.: 15/256,910

(22) Filed: Sep. 6, 2016

(65) Prior Publication Data

US 2017/0066659 A1   Mar. 9, 2017

(30) Foreign Application Priority Data

Sep. 6, 2015   (CN) ..................... 2015 2 0688117 U

(51) Int. Cl.
| | | |
|---|---|---|
| B01D 35/18 | (2006.01) | |
| B01D 35/26 | (2006.01) | |
| B01D 63/00 | (2006.01) | |
| C02F 1/00 | (2006.01) | |

(52) U.S. Cl.
CPC ........ *C02F 1/002* (2013.01); *C02F 2201/005* (2013.01)

(58) Field of Classification Search
None
See application file for complete search history.

(56) References Cited

U.S. PATENT DOCUMENTS

| | | | | |
|---|---|---|---|---|
| 2,436,077 | A * | 2/1948 | Robertson | C02F 1/003 210/317 |
| 4,218,317 | A * | 8/1980 | Kirschmann | B01D 61/08 210/133 |
| 5,013,461 | A * | 5/1991 | Drori | B01D 29/114 210/193 |
| 6,139,750 | A * | 10/2000 | Graham | B01D 61/06 210/652 |
| 7,534,349 | B2 * | 5/2009 | Collins | A45F 3/20 210/257.2 |
| 2018/0118597 | A1 * | 5/2018 | Bechtold | C02F 9/00 |

* cited by examiner

*Primary Examiner* — Ana M Fortuna

(57) ABSTRACT

Provided is an outdoor water purifier with backwashing function relating to a mini outdoor portable backwashing water purifier. It comprises a raw water inlet apparatus comprising a raw water inlet channel and a water inlet one-way valve device provided on the raw water inlet channel; a filtering apparatus comprising a filtering chamber and a filter core assembly provided therein, provided behind the water inlet one-way valve device and communicating with the raw water inlet apparatus; a piston apparatus comprising a piston cylinder, a piston located in the chamber of the piston cylinder, a piston rod and a handle, the piston cylinder chamber communicating with the filtering apparatus; and a purified water outlet apparatus comprising a purified water outlet channel provided with a water outlet one-way valve device, and a purified water outlet provided with a switch device. It further comprises a backwashing drainage apparatus communicating with the filtering apparatus.

4 Claims, 4 Drawing Sheets

OUTDOOR WATER PURIFIER WITH BACKWASHING FUNCTION

CROSS REFERENCE TO RELATED APPLICATION

This application claims benefit of Application No. CN201520688117.3, filed on Sep. 6, 2015 in China and which application is incorporated herein by reference. A claim of priority is made.

TECHNICAL FIELD

The present invention, which is an outdoor water purifier with backwashing function, relates to the technical field of mini water purifiers, particularly to a mini outdoor portable water purifier, and specifically to a portable water purifier with backwashing function.

BACKGROUND

As one can imagine, a small carry-on portable water purifier is helpful to tourists, outdoor operators, people who do rescue and relief work, and those in water shortage areas. Therefore, many types of mini water purifiers appear in the market. Due to limitation to portability, such small or mini water purifier generally has a smaller volume to facilitate carrying, thus its function is also limited. For example, after an ultrafine fiber filter core has been used several times, fine pores in the ultrafine fiber wall are easily blocked by some contaminants such as impurities, silt and the like, and the filter core is not washable, thus the water purifier has a smaller amount of water discharged, or even cannot achieve the water purification function, and the filter core has to be replaced. Therefore, this not only causes waste, but also causes many inconveniences to a user since the user has to carry a plurality of filter core assemblies for use when necessary.

SUMMARY

The object of the present invention is to overcome the defects of the background art mentioned above and to provide a portable water purifier with backwashing function, which can perform backwashing on a filter core at any time, ensure the filtering efficiency of a filtering apparatus, greatly prolong the service life of the filter core, save resources, and also relieve a user from the trouble of carrying backup filter cores and provide great convenience for the user.

The technical solution adopted by the present application is: an outdoor water purifier with backwashing function, comprising a raw water inlet apparatus which comprises a raw water inlet channel and a water inlet one-way valve device provided on the raw water inlet channel; a filtering apparatus which comprises a filtering chamber and a filter core assembly provided therein, the filtering apparatus being provided behind the water inlet one-way valve device and communicating with the raw water inlet apparatus; a piston apparatus which comprises a piston cylinder, a piston located in a piston cylinder chamber thereof, a piston rod and a handle, the piston cylinder chamber communicating with the filtering apparatus; and a purified water outlet apparatus which comprises a purified water outlet channel and a purified water outlet, the purified water outlet channel being provided with a water outlet one-way valve device. It is characterized by further comprising a backwashing drainage apparatus communicating with the filtering apparatus; and the purified water outlet being provided with a switch device.

In the outdoor water purifier with backwashing function described above, the backwashing drainage apparatus comprises a drainage hole, and the drainage hole is provided thereon with a sliding cover.

In the outdoor water purifier with backwashing function described above, the backwashing drainage apparatus comprises a drainage hole, and the drainage hole is provided with a one-way valve ball, and the one-way valve ball is embodied by providing a steel bead, an adjustable screw and a reset spring provided between the steel bead and the adjustable screw in a channel of the drainage hole.

In the outdoor water purifier with backwashing function described above, the purified water outlet is provided with a switch device, and the switch device is a rotary opening-closing device.

The present invention has the following beneficial effects compared to the prior art:

1. By providing a drainage apparatus, the present invention can repeatedly wash the filter core, so that the service life of the filter core is prolonged and the backwashing function of the water purifier is achieved.

2. The drainage apparatus is provided therein with an adjustable screw by which the elasticity of the spring can be adjusted suitably depending on the condition of water quality, the degree of blocking of the filter core (i.e., the magnitude of a resisting force in a water filtration cylinder body) and the magnitude of a force applied by a user to control the steel bead, which makes the operation simple and convenient.

DETAILED DESCRIPTION OF EMBODIMENTS

The present invention will be described in detail below with reference to the drawings and specific embodiments.

FIGS. 1, 2, 3, and 4 show examples of an outdoor water purifier with backwashing function of the present invention.

Figure 1:
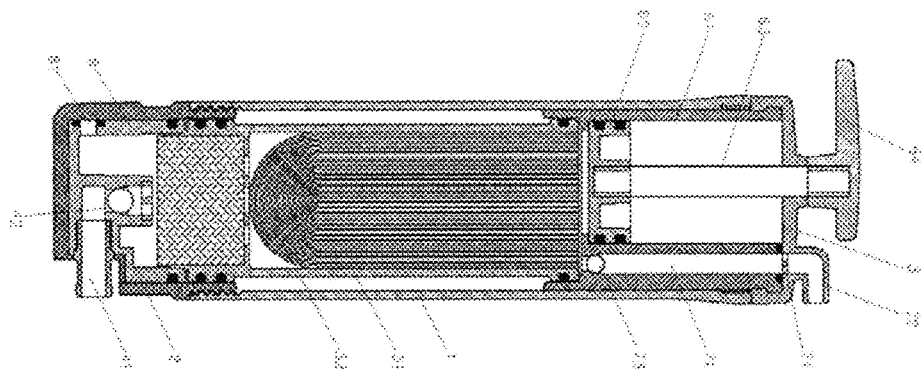
FIG. 1 is a cross-sectional view of examples of an outdoor water purifier with backwashing function of the present invention.
Figure 2:
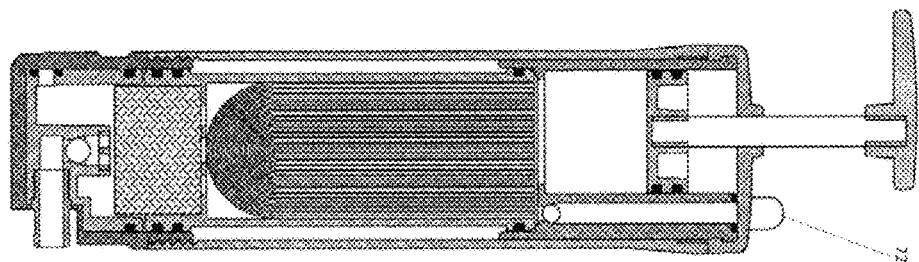
FIG. 2 is a schematic diagram of the examples shown in FIG. 1 in a state where a purified water outlet is closed.
Figure 3:
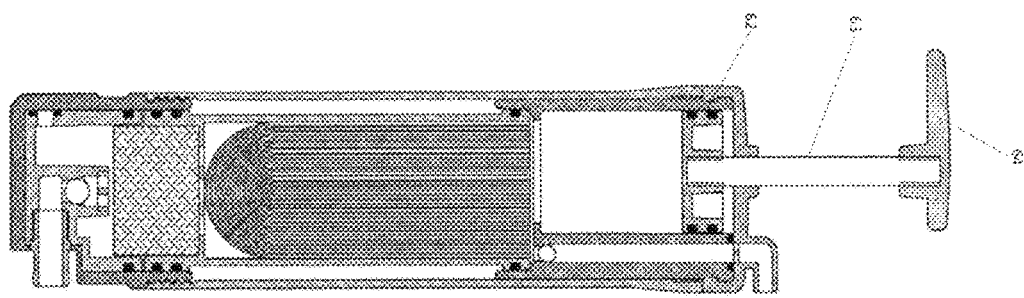
FIG. 3 is a schematic diagram of the examples shown in FIG. 1 in a state where a piston is pulled out.
Figure 4:
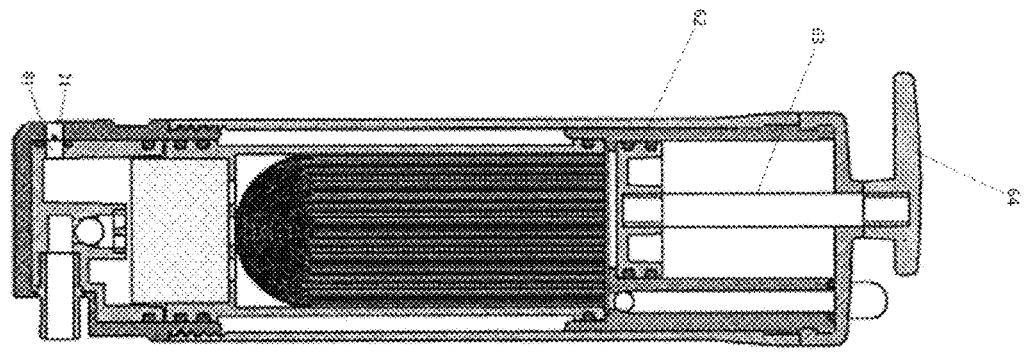
FIG. 4 is a schematic diagram of the examples shown in FIG. 2 in a state where the piston is returned to an original position.

The outdoor water purifier comprises a water purifier housing 1, and a base 2 having a through hole 21 and a cylinder cover 3 which are connected therewith. A raw water inlet apparatus is provided at an inner tank 9 in the base 2, and comprises a raw water inlet channel 41 and a water inlet one-way valve device 42 provided on the raw water inlet channel 41. A filtering apparatus is provided in the housing 1 and comprises a filtering chamber 51 and a filter core assembly 52 provided therein, and the filtering apparatus is provided behind the water inlet one-way valve device 42 and communicates with the raw water inlet apparatus. A piston apparatus is provided in the housing 1 and comprises a piston cylinder 61, the cylinder cover 3, a piston 62 located in a piston cylinder chamber thereof, a piston rod 63, and a handle 64, and the piston cylinder chamber communicates with the filtering apparatus. A purified water outlet apparatus is also provided in the housing 1 and comprises a purified water outlet channel 71 and a purified water outlet 72. The purified water outlet channel 71 is provided with a water outlet one-way valve device 73. The purified water outlet 72 is provided with a switch device 74. The switch device 74 is a rotary opening-closing device. The water outlet one-way valve device 73 communicates with the piston cylinder chamber. Further comprised in the base 2 is a backwashing drainage apparatus communicating with the filtering apparatus. The backwashing drainage apparatus comprises a drainage hole 81 provided in the inner tank 9. In this way, when a backwashing operation is carried out, the cylinder cover 3 is rotated to close the purified water outlet 72, the handle 64 is grasped to pull the piston rod 63, so that raw water enters the piston cylinder chamber after being filtered by the filtering apparatus, as shown in FIGS. 2, 3, and 4, and then the inner tank 9 in the base 2 is rotated so that the drainage hole 81 communicates directly with the through hole 21 of the base 2, and in this case, the base 2 functions similarly to a sliding cover. The handle 64 is pushed to press the piston 62 downward, so that the purified water in the piston cylinder chamber reversely enters the filter core assembly 52 to wash contaminants on an external surface of the filter core which are then discharged together with the washing water from the drainage hole 81 out of the water purifier, and such operation can be repeated many times until the filter core is washed clean so as to achieve the backwashing function.

Figure 5:
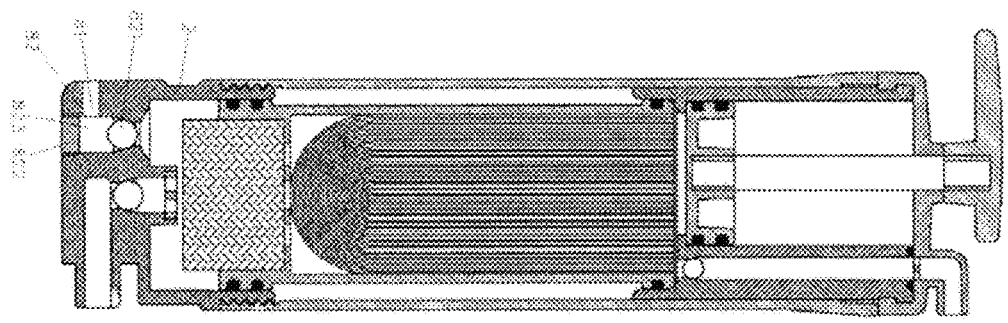
FIG. 5 is a cross-sectional view of other examples of the outdoor water purifier with backwashing function of the present invention.
Figure 6:
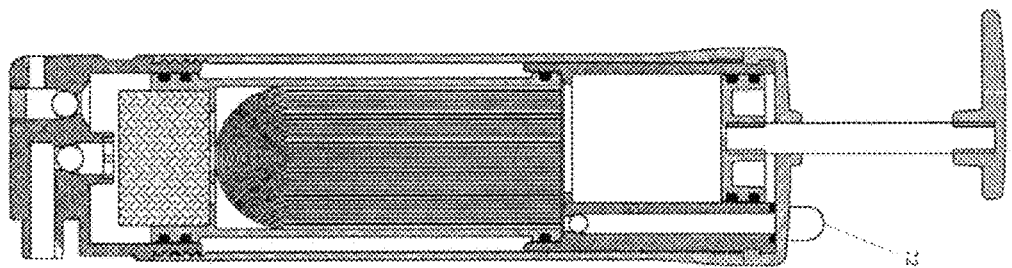
FIG. 6 is a schematic diagram of the examples shown in FIG. 5 in a state where a purified water outlet is closed.
Figure 7:
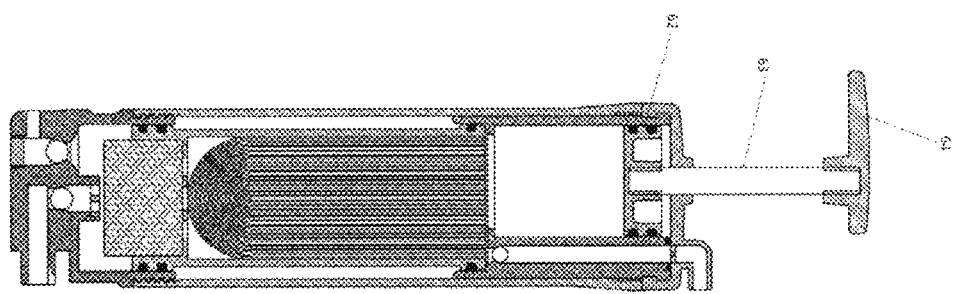
FIG. 7 is a schematic diagram of the examples shown in FIG. 5 in a state where a piston is pulled out.

FIGS. 5, 6, and 7 show other examples of the outdoor water purifier with backwashing function of the present invention.

The other examples are different from the examples described above in that there is no inner tank in the base 2, the backwashing drainage apparatus is provided directly in the base 2, the drainage hole 81 is provided with a one-way valve ball 82, and the one-way valve ball 82 is embodied by providing a steel bead 821, an adjustable screw 822 and a reset spring 823 provided between the steel bead 821 and the adjustable screw 822 in a channel of the drainage hole. This structural mode can achieve automatic discharge of contaminants. When the filter core assembly is blocked by contaminants to an extent, that is to say, a pressure applied to the piston reaches to an extent, i.e., exceeds a pressure set for the one-way valve ball 82, and at this time, the drainage hole 81 will communicate directly with the through hole 21 of the base 2 to carry out the operation of discharging contaminants. This structure can effectively prevent the filter core assembly from being damaged due to a too large differential pressure, and prolong the service life of the filter core assembly.

The above-mentioned embodiments are merely specific examples of the present invention and are not intended to limit the implementation and scope of the present invention, and any equivalent variations and modifications made according to the description within the scope of the present patent application for invention should be included in the scope of the patent application for invention.

The invention claimed is:

1. An outdoor water purifying system with backwash function, comprising
    a raw water inlet apparatus, comprising a raw water inlet channel and a water inlet one-way valve device provided on the raw water inlet channel;
    a filtering apparatus, comprising a filtering chamber and a filter core assembly provided in the filtering chamber, wherein the filtering apparatus is provided behind the water inlet one-way valve device and communicates with the raw water inlet apparatus;
    a piston apparatus, comprising a piston cylinder, a piston located in a chamber of the piston cylinder, a piston rod and a handle, wherein the piston cylinder chamber communicates with the filtering apparatus; and
    a purified water outlet apparatus, comprising a purified water outlet channel and a purified water outlet, wherein the purified water outlet channel is provided with a water outlet one-way valve device;
    wherein the outdoor water purifying system further comprises a backwash drainage apparatus communicating with the filtering apparatus; and the purified water outlet is provided with a switch device, and the backwash drainage apparatus comprises a drainage hole, with a one-way valve ball provided in the drainage hole, and the one-way valve ball is configured in such a way that a steel bead, an adjustable screw and a reset spring between the steel bead and the adjustable screw are provided in a channel of the drainage hole.

2. The outdoor water purifying system with backwash function according to claim 1, wherein the backwash drainage apparatus comprises a drainage hole, and the drainage hole is provided thereon with a sliding cover.

3. The outdoor water purifying system with backwash function according to claim 2, wherein the purified water outlet is provided with a switch device, and the switch device is a rotary opening-closing device.

4. The outdoor water purifying system with backwash function according to claim 1, wherein the purified water outlet is provided with a switch device, and the switch device is a rotary opening-closing device.

* * * * *